May 27, 1930. E. P. KERRUISH 1,759,906
METHOD OF MAKING BEARINGS
Filed Dec. 19, 1928
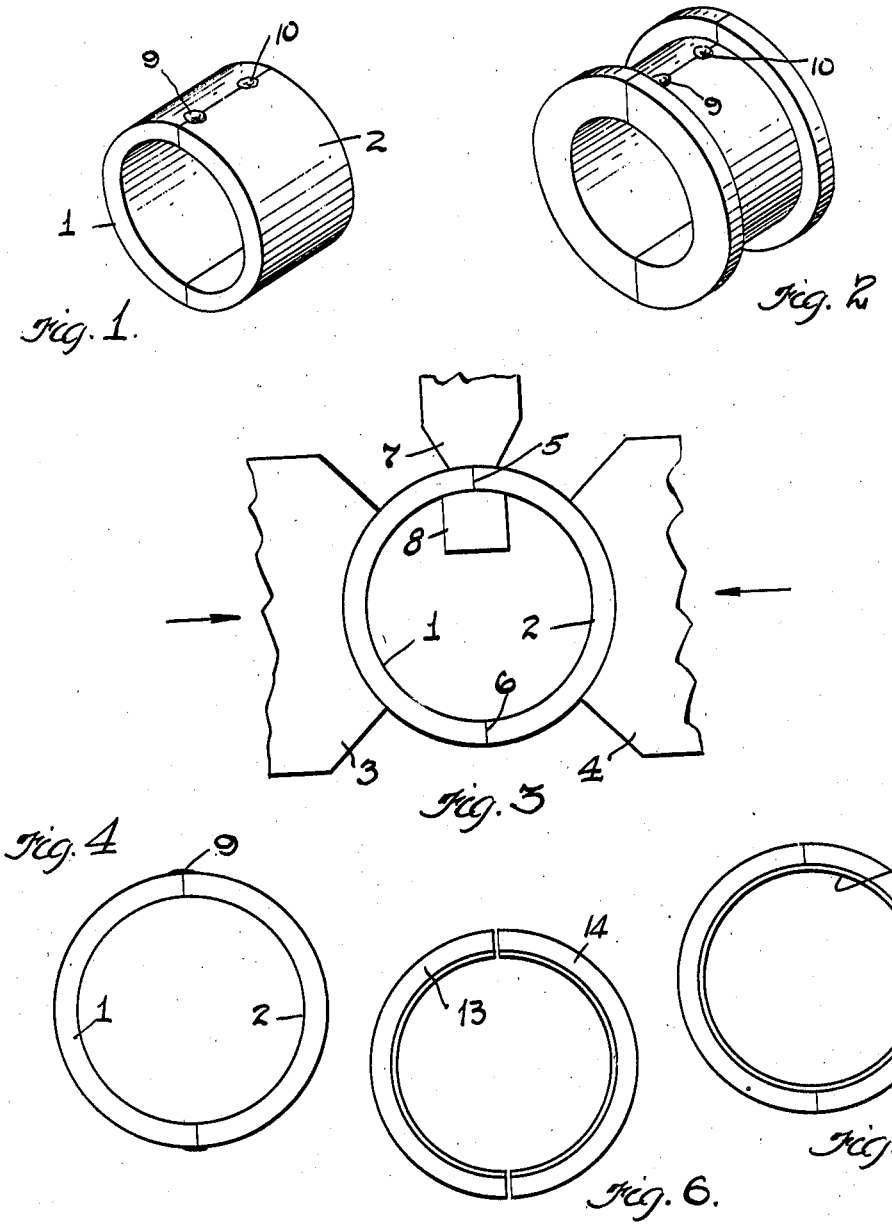
INVENTOR.
Edward P. Kerruish.
BY
Fay, Oberlin & Fay
ATTORNEYS.

Patented May 27, 1930

1,759,906

UNITED STATES PATENT OFFICE

EDWARD P. KERRUISH, OF CLEVELAND HEIGHTS, OHIO, ASSIGNOR TO THE CLEVELAND GRAPHITE BRONZE COMPANY, OF CLEVELAND, OHIO, A CORPORATION OF OHIO

METHOD OF MAKING BEARINGS

Application filed December 19, 1928. Serial No. 327,143.

The present invention, relating, as indicated, to a bearing and method of making same is more particularly directed to the manufacture of lined semi-cylindrical bearings initially formed from flat stock, bent or formed either into split cylindrical shape or formed into semi-cylindrical shape. In the latter case two semi-cylindrical articles are of course then mounted together to form a cylindrical shell for the application of a lining metal to the interior. The present invention is directed to a simple and inexpensive means for temporarily securing together either the joint of a shell formed from a single strip of metal or the joints in shells formed of two semi-cylindrical strips.

To the accomplishment of the foregoing and related ends, said invention, then, consists of the means hereinafter fully described and particularly pointed out in the claims; the annexed drawing and the following description setting forth in detail one method and one product exemplyfying my invention, such disclosed procedure and product constituting, however, but one of various applications of the principle of my invention.

In said annexed drawing:—

Fig. 1 is a view in perspective of a cylindrical shell formed of two semi-cylindrical shells or strips united by the present method; Fig. 2 is a similar view of a shell also formed of two semi-cylindrical strips, but the shell of this figure is shown provided with flanges; Fig. 3 is an end elevation more or less diagrammatic in character illustrating my improved method of uniting the joints in such shell; Fig. 4 is an end elevation of the shell after the operation referred to; Fig. 5 is an end elevation of a shell after the lining operation; and Fig. 6 is a similar view showing the lined shell after splitting.

Lined bearings are now made in large quantities from flat stock which is first formed into cylindrical shape and then lined with a suitable bearing metal, after which the lined cylindrical shell is split into two semi-cylindrical bearings. It is also entirely possible to form semi-cylindrical bearings directly from flat stock, but in this case it is desirable and economical to then join two half bearings into a single cylindrical bearing for convenience in the lining operation, as this lining is ordinarily carried out either by die casting a suitable bearing metal on the inside of the shell thus formed or by centrifugally casting bearing metal on the inside of the shell. In either case the bearing metal is applied under considerable pressure and unless a fluid-tight joint between the edges of the shell or shells is provided, bearing metal is forced out at this point, causing not only the loss of the bearing metal, but in some cases serious accidents to the workmen. The present method is directed to the provision of a fluid-tight joint between the abutting edges of the shell for the lining operation.

Referring now to Fig. 3, there are shown two semi-cylindrical shells 1 and 2 of the same diameter mounted between clamping jaws 3 and 4 where these two semi-cylindrical articles are held with considerable transverse pressure which acts across the joints 5 and 6. It will be understood that in case a split cylindrical shell is employed it may be mounted in the same manner as the two half shells shown above. Sufficient pressure must be applied to the shell or to the two half shells to force the joint or joints into tight engagement, but the pressure must not be sufficient to distort the shells any appreciable amount from their original condition. The shell or shells as thus held are then operated upon by welding electrodes 7 and 8 and are spot-welded at two or more points indicated at 9 and 10 in Figs. 1 and 2. The welding current passes from one electrode to the other through the metal adjacent the contacting ends of the shell or shells, integrally uniting these shells and forming a slight burr, which is shown at the points 9 and 10 in Figs. 1, 2 and 4. As the shells are maintained in their pressure engagement during this welding operation the joint which is thus obtained is an extremely tight engagement which is sufficiently close to prevent leakage of fluid during the lining operation.

After the formation of the joint as described above the shells may be machined to remove the slight burr which is formed at the points of application of the electrode and may then be placed in a die casting or a centrifugal casting machine to supply an inner lining 11 of suitable bearing material, such, for example, as babbitt. After certain subsequent operations, such as the machining of the inside and the outside of the lined shell the shell may be split by sawing in any suitable manner on a diameter passing through the joint or joints previously closed by the welding operation, thus producing the two lined half bearings 13 and 14, which are shown in Fig. 6.

It will be understood that the joint or joints in the shell or shells may be closed either by welds of the type described or by welds of other types, although I prefer, by reason of convenience and economy, the method of spot welding which is described and illustrated. It will be also understood that the number of welds may be proportioned to the length, and possibly to the thickness, of the shell, although in ordinary cases where the bearings run from one to two inches in length I have found two welds at each joint entirely sufficient to provide a fluid-tight engagement between the abutting ends.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making bearing shells, the steps which consist in forming two approximately semi-cylindrical shells from flat stock, holding said shells with their abutting edges in accurate tight engagement with considerable pressure, and then integrally uniting said abutting edges with a union of less strength than that of the stock to maintain such edges in said tight engagement for a subsequent operation.

2. In a method of making bearing shells, the steps which consist in forming two approximately semi-cylindrical shells, pressing said shells together with their edges in accurate tight abutment, integrally uniting said abutting edges to maintain such engagement and then lining the cylindrical shell thus formed with said bearing material.

3. In a method of making bearing shells, the steps which consist in forming two approximately semi-cylindrical shells, pressing said shells together with their edges in accurate tight abutment, integrally uniting said abutting edges to maintain such engagement lining the cylindrical shell thus formed with said bearing material, and then splitting said lined shell upon a diametral plane passing through the united edges of said original shells.

Signed by me, this 12th day of Dec., 1928.
EDWARD P. KERRUISH.